United States Patent
Day et al.

(10) Patent No.: US 12,546,280 B2
(45) Date of Patent: Feb. 10, 2026

(54) EQUALIZATION TANK ASSEMBLIES FOR WASTEWATER SYSTEMS

(71) Applicant: Trane International Inc., Davidson, NC (US)

(72) Inventors: Michael Sean Day, Sacramento, CA (US); Casey Borst, Louisville, KY (US)

(73) Assignee: TRANE INTERNATIONAL INC., Davidson, NC (US)

( * ) Notice: Subject to any disclaimer, the term of this patent is extended or adjusted under 35 U.S.C. 154(b) by 38 days.

(21) Appl. No.: 18/515,594

(22) Filed: Nov. 21, 2023

(65) Prior Publication Data

US 2025/0163881 A1  May 22, 2025

(51) Int. Cl.
| | |
|---|---|
| *F03B 13/00* | (2006.01) |
| *F03B 13/06* | (2006.01) |
| *F03B 15/08* | (2006.01) |
| *F03B 17/06* | (2006.01) |

(52) U.S. Cl.
CPC ............. *F03B 13/06* (2013.01); *F03B 15/08* (2013.01); *F03B 17/06* (2013.01); *F05B 2220/602* (2013.01); *F05B 2240/241* (2013.01)

(58) Field of Classification Search
CPC .......... F03B 13/06; F03B 15/08; F03B 17/06; F05B 2220/602; F05B 2240/241
See application file for complete search history.

(56) References Cited

U.S. PATENT DOCUMENTS

| | | | |
|---|---|---|---|
| 4,426,846 A * | 1/1984 | Bailey | F03D 9/17 60/398 |
| 5,389,821 A | 2/1995 | Moulliet | |
| 5,487,621 A * | 1/1996 | Takada | F04D 29/669 405/80 |
| 6,318,395 B1 | 11/2001 | Anderson et al. | |
| 8,147,167 B2 | 4/2012 | Cripps | |
| 9,657,711 B2 * | 5/2017 | Stausgaard | F03B 17/063 |
| 9,997,914 B2 | 6/2018 | Day et al. | |
| 10,184,221 B2 | 1/2019 | Watson | |
| 2005/0034452 A1 | 2/2005 | Davis | |
| 2005/0248161 A1 * | 11/2005 | Heidel | F03B 13/00 290/54 |
| 2008/0253837 A1 | 10/2008 | Miller | |
| 2010/0096858 A1 | 4/2010 | Riley | |
| 2014/0197640 A1 * | 7/2014 | Barakat | F03B 13/08 290/54 |
| 2021/0159825 A1 * | 5/2021 | Bergman | F03B 15/08 |
| 2023/0096161 A1 | 3/2023 | Day | |

* cited by examiner

*Primary Examiner* — Julio C. Gonzalez
(74) *Attorney, Agent, or Firm* — Womble Bond Dickinson (US) LLP

(57) ABSTRACT

An embodiment of a system includes a pipeline of a wastewater system, an equalization tank that is configured to receive wastewater from the pipeline, and a return line extending from the equalization tank to the pipeline. In addition, the system includes an electricity generation assembly in fluid communication with the return line that is configured to generate electrical power using a flow of wastewater through the return line. The electricity generation assembly includes a flow channel, a water wheel that is partially inserted into the flow channel such that a portion of the water wheel is extended outside of the flow channel, and an electrical generator connected to the water wheel.

20 Claims, 6 Drawing Sheets

EQUALIZATION TANK ASSEMBLIES FOR WASTEWATER SYSTEMS

CROSS-REFERENCE TO RELATED APPLICATIONS

Not applicable.

BACKGROUND

Stormwater and/or sewage systems may employ equalization tanks to buffer the variations in the flow rate over time. For instance, an equalization tank may be used to reduce or eliminate flow rate variations upstream of a water treatment plant or other facility. Specifically, the buffer tank may divert and hold a portion of the stormwater and/or sewage from a stormwater and/or sewage pipeline during times of high-flow rates, and may then return the captured stormwater and/or sewage back to the pipeline during times of lower flow rates.

BRIEF SUMMARY

Some embodiments disclosed herein are directed to a system including a pipeline of a wastewater system, an equalization tank that is configured to receive wastewater from the pipeline, and a return line extending from the equalization tank to the pipeline. In addition, the system includes an electricity generation assembly in fluid communication with the return line that is configured to generate electrical power using a flow of wastewater through the return line. The electricity generation assembly includes a flow channel, a water wheel that is partially inserted into the flow channel such that a portion of the water wheel is extended outside of the flow channel, and an electrical generator connected to the water wheel.

Some embodiments disclosed herein are directed to a method including (a) diverting wastewater out of a pipeline of a wastewater system to an equalization tank. In addition, the method includes (b) flowing the wastewater out of the equalization tank and through an electricity generation assembly to generate electrical power. The electricity generation assembly includes a flow channel, a water wheel that is partially inserted into the flow channel such that a portion of the water wheel is extended outside of the flow channel, and an electrical generator connected to the water wheel. Further, the method includes (c) flowing the wastewater back to the pipeline after (b).

Some embodiments are directed to a system including a pipeline of a wastewater system, an equalization tank, a weir in the pipeline that is actuatable to adjust a liquid height in the pipeline that is configured to flow past the weir and toward the equalization tank, and a return line extending from the equalization tank to the pipeline. In addition, the system includes an electricity generation assembly in fluid communication with the return line that is configured to generate electrical power using a flow of wastewater. The electricity generation assembly includes a flow channel, a Poncelet wheel that is inserted into the flow channel, and an electrical generator connected to the Poncelet wheel.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which.

DETAILED DESCRIPTION

An equalization tank is used to receive excess flows from a stormwater and/or sewage during times of high flow rates. Stormwater systems, sewage systems, drainage systems, and the like may be collectively and generally referred to herein as "wastewater systems", and the fluid flowed through such systems is collectively and generally referred to herein as "wastewater." Diverting the excess flow rate to the equalization tank may be useful for avoiding an overflow into downstream sections or portions of the wastewater system and/or a downstream water treatment plant, storage, or other facility. In addition, the retained fluid (e.g., stormwater and/or sewage) may be reinjected into the corresponding wastewater system during times of lower flow rates.

While equalization tanks have been successfully employed in wastewater systems to provide the above-noted benefits, conventional equalization tanks and related systems would benefit from further enhancements and improvements. For instance, flow systems for equalization tanks may be simplistic, and may therefore lack adequate controls over the flow of wastewater into and out of the equalization tank during operations (particularly during non-emergency conditions or operations). In addition, the flow of wastewater through a wastewater system represents a largely untapped source of energy that may be harnessed for electricity production (e.g., for a utility grid and/or for local use in the stormwater and/or sewage system itself).

Accordingly, embodiments disclosed herein include systems and methods for enhancing the performance, utility, and controllability of an equalization tank assembly in a wastewater system. In some embodiments, an adjustable valving member (e.g., such as an actuatable weir) may be included to selectively increase or decrease the flow of fluid from the wastewater system to the equalization tank. In addition, in some embodiments, an electricity generation assembly may be included that is configured to generate electrical power from the fluid outflow from the equalization tank. Through use of the embodiments disclosed herein, an equalization tank for a wastewater system may achieve more efficient and reliable operation.

Figure 1:
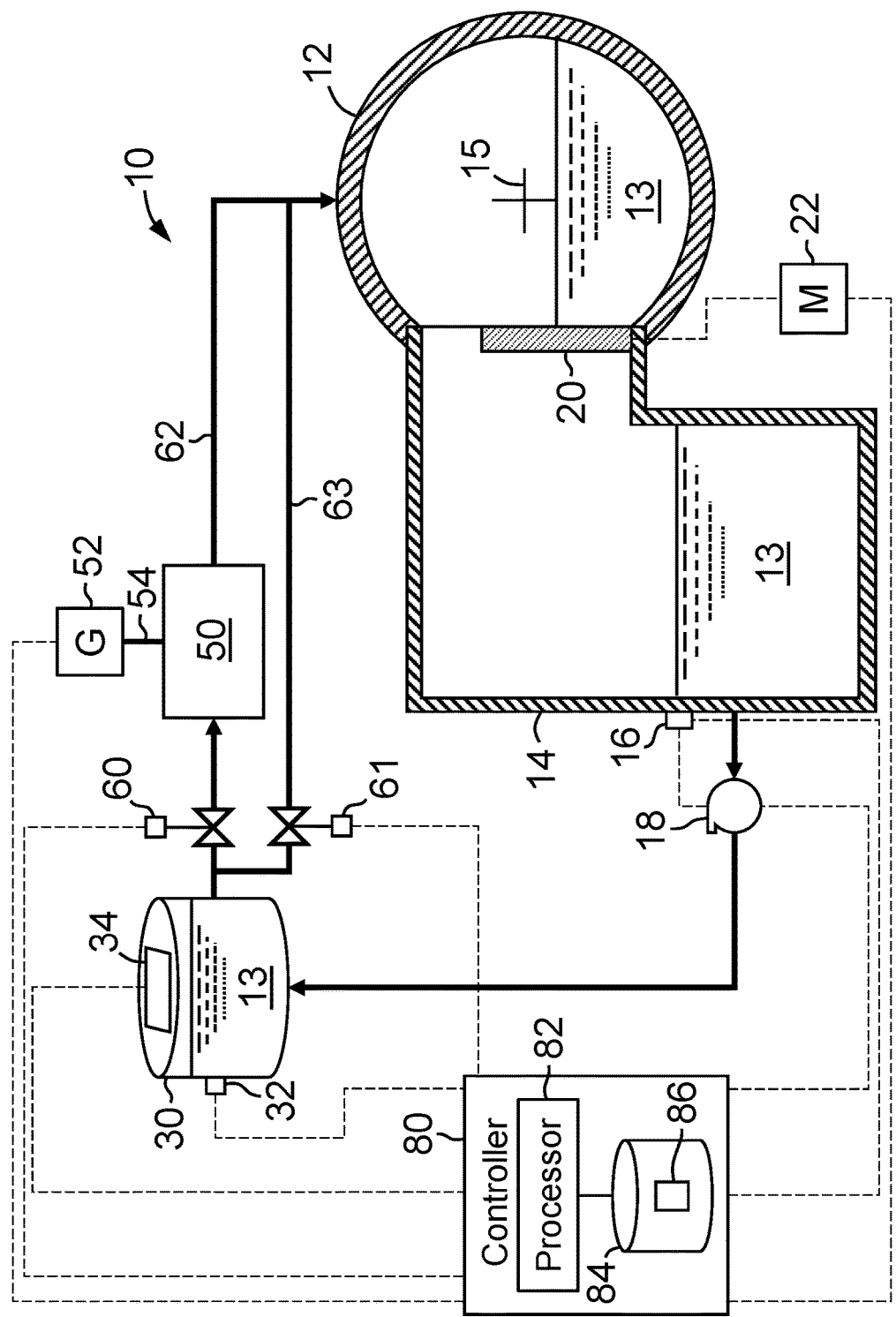
FIG. 1 is a schematic diagram of an equalization tank system according to some embodiments disclosed herein.

Referring now to FIG. 1, an equalization tank assembly 10 for storing excess flow from a wastewater system is shown according to some embodiments. The equalization tank assembly 10 includes a sump 14 that is connected to a pipeline 12 of the wastewater system. The pipeline 12 may carry wastewater 13 therein. The wastewater 13 may include any suitable source(s) of wastewater, include (without limitation) sewage, stormwater runoff, drainage, or some combination thereof. The pipeline 12 may be elongated along a central or longitudinal axis 15 such that pipeline 12 generally directs, channels, or conducts the wastewater 13 along the axis 15. The pipeline 12 may be coupled to a wastewater storage and/or treatment facility (not shown), such as, for instance, a sewage treatment plant, a retention pond, a stormwater treatment plant, etc.

The sump 14 is in fluid communication with the pipeline 12 such that wastewater 13 may flow from the pipeline 12 into the sump 14 during operations. Specifically, in some embodiments, wastewater 13 may deviate or divert in a radial direction out of the pipeline 12 and into the sump 14 relative to the longitudinal axis 15.

An adjustable valving member 20 is positioned between the sump 14 and the pipeline 12 that is configured to adjust a flow of wastewater 13 from the pipeline 12 to the sump 14. For instance, as will be described in more detail herein, the adjustable valving member 20 may include an actuatable weir that is configured to prevent or allow flow of wastewater 13 into the sump 14 from the pipeline 12 depending on a liquid level in the pipeline 12. A motor 22 may be coupled to the adjustable valving member 20 and is configured to actuate the adjustable valving member 20 to a plurality of positions so as to adjust the liquid level in the pipeline 12 that is configured to flow past the adjustable valving member 20 and into the sump 14 during operations. The motor 22 may comprise one or more suitable driver(s) or motor(s), such as, for instance, electrical motor(s), hydraulic motor(s), pneumatic motor(s), or some combination thereof.

A sump pump 18 (or more simply "pump" 18) may be in fluid communication with the sump 14 and may be configured to flow fluid out of the sump 14 and into an equalization tank 30. The pump 18 (which may comprise one or a plurality of pumps) may be communicatively coupled to a level switch 16 that is configured to detect a liquid level above a predetermined level in the sump 14. During operations, when the liquid level in the sump 14 rises to or above the level switch 16, the level switch 16 may output a suitable signal, and the sump pump 18 may be activated based at least in part on the signal so as to drain the wastewater 13 from the sump 14 and deliver it to the equalization tank 30. In some embodiments, a controller (e.g., controller 80 described in more detail herein) may receive an output signal from the level switch 16, and may in turn activate the pump 18 to drain wastewater 13 from the sump as previously described.

The equalization tank 30 may comprise one or more (e.g., a plurality of) tanks, pits, bladders, or any other suitable reservoir for holding a volume of liquid. In some embodiments, the equalization tank 30 may comprise one or more rigid tanks that may be positioned above ground. The equalization tank 30 may receive and hold wastewater 13 from the sump 14 via the sump pump 18.

A return line 62 extends from the equalization tank 30 to the pipeline 12. A valve 60 is positioned along the return line 62 that is configured to prevent or allow the wastewater 13 stored in the equalization tank 30 back to the pipeline 12 during operations. The valve 60 may be actuatable to a fully closed position—in which flow of wastewater 13 along the return line 62 is prevented, a fully open position—in which the flow of wastewater 13 along the return line 62 is not constricted (or substantially not constricted) by the valve 60, and a plurality of positions between the fully open position and the fully closed position that are configured to meter or adjust a flowrate of wastewater 13 through the return line 62 during operations.

An electricity generation assembly 50 is also positioned along (or at least in communication with) the return line 62. For instance, the electricity generation assembly 50 may be positioned along (or in communication with) the return line 62, between the valve 60 and the pipeline 12. The electricity generation assembly 50 is configured to convert the flow of wastewater 13 through the return line 62 into electrical power that then may be used to operate other components of the equalization tank system 10 (e.g., sump pump 18, level switch 16, motor 22, adjustable valving member 20, controller 80, valve 60, etc.), and/or may be conducted to a local utility grid, battery bank, or another location. More particularly, as will be described in more detail below, the electricity generation assembly 50 may include a waterwheel assembly (not shown) that is actuated by the flow of wastewater 13 so as to actuate an electrical generator 52 to generate electrical power.

In some embodiments, an additional return line 63 extends from equalization tank 30 to the pipeline 12 in parallel with the return line 62. Thus, the additional return line 63 may comprise a bypass line around the electricity generation assembly 50. A valve 61 is positioned along the additional return line 63 that is configured to prevent or allow the wastewater 13 stored in the equalization tank 30 back to the pipeline 12 via the additional return line 63 during operations. Like the valve 60, the valve 61 may be actuatable to a fully closed position—in which flow of wastewater 13 along the additional return line 63 is prevented, a fully open position—in which the flow of wastewater 13 along the additional return line 63 is not constricted (or substantially not constricted) by the valve 61, and a plurality of positions between the fully open position and the fully closed position that are configured to meter or adjust a flowrate of wastewater 13 through the additional return line 63 during operations.

In some embodiments, one or both of the valves 60, 61 may be omitted or normally placed in an open position. For instance, the return line(s) 62, 63 may be communicated with an upper end portion or region of the equalization tank 30 so that flow out of the equalization tank into one or both of the return lines 62, 63 is achieved when there is a sufficient liquid level in the equalization tank 30.

The equalization tank 30 may be positioned vertically higher than the pipeline 12 (or at least the portion of the pipeline 12 that is coupled to the return line 62 and the additional return line 63). As a result, the wastewater 13 may flow from the equalization tank 30 to the pipeline 12 through the return lines 62, 63 via head pressure. In some embodiments, the head pressure between the equalization tank 30 and the pipeline 12 may be from about 5 feet to about 30 feet. Thus, the use of the electricity generation assembly 50 may convert the gravity-based flow of the wastewater 13 into electrical power, which may greatly increase an overall power efficiency of the equalization tank assembly 10.

The equalization tank assembly 10 may include a controller 80 that is coupled to one or more components (e.g., pump 18, adjustable valving member 20, valves 60, 61, electricity generation assembly 50, etc.) that is configured control the flow of wastewater 13 through the equalization tank assembly 10. For instance, the controller 80 may control the flow of wastewater 13 from the pipeline 12 to the equalization tank 30 and from the equalization tank 30 back to the pipeline 12 via the return line 62 and/or the additional return line 63.

The controller 80 may comprise one or more computing devices, such as a computer, tablet, smartphone, server, circuit board, semiconductor chip, or other computing device(s) or system(s). Thus, controller 80 may include a processor 82 and a memory 84.

The processor 82 may include any suitable processing device or a collection of processing devices. In some embodiments, the processor 82 may include a microcontroller, central processing unit (CPU), graphics processing unit (GPU), timing controller (TCON), scaler unit, or some combination thereof. During operations, the processor 82 executes machine-readable instructions (such as machine-readable instructions 86) stored on memory 84, thereby causing the processor 82 to perform some or all of the actions attributed herein to the controller 80. In general, processor 82 fetches, decodes, and executes instructions (e.g., machine-readable instructions 86). In addition, processor 82 may also perform other actions, such as, making determinations, detecting conditions or values, etc., and communicating signals. If processor 82 assists another component in performing a function, then processor 82 may be said to cause the component to perform the function. The processor 82 may include one processing device or a plurality of processing devices.

The memory 84 may be any suitable device or collection of devices for storing digital information including data and machine-readable instructions (such as machine-readable instructions 86). For instance, the memory 84 may include volatile storage (such as random-access memory (RAM)), non-volatile storage (e.g., flash storage, read-only memory (ROM), etc.), or combinations of both volatile and non-volatile storage. Data read or written by the processor 82 when executing machine-readable instructions 86 can also be stored on memory 84. Memory 84 may include "non-transitory machine-readable medium," where the term "non-transitory" does not include or encompass transitory propagating signals. The memory 84 may include one memory device or a plurality of memory devices.

During operations, the controller 80 may actuate the adjustable valving member 20 so as to selectively allow wastewater 13 to flow out of the pipeline 12 and into the sump 14, and ultimately into the equalization tank 30 via the pump 18. For instance, the controller 80 may control the flow of wastewater 13 into the equalization tank 30 (e.g., via the adjustable valving member 20) based on a variety of factors, such as, for instance, the volume of wastewater 13 currently stored in the equalization tank 30 (e.g., via an output from one or more level sensors 32 coupled to the equalization tank 30), etc.

In some embodiments, the controller 80 may actuate the adjustable valving member 20 to prevent, enable, increase, or decrease a flow of wastewater 13 out of the pipeline 12 and into the sump 14 based on a liquid level in the equalization tank 30 (e.g., as indicted by the sensor(s) 32). For instance, the controller 80 may prioritize diversion of wastewater 13 out of the pipeline 12 to the equalization tank 30 to ensure a minimum or desired liquid level in the equalization tank 30 for driving electrical power generation via the electricity generation assembly 50 as previously described. In some embodiments, the controller 80 may actuate the adjustable valving member 20 to prevent or decrease the flow of wastewater 13 into the sump 14 so as to prevent (or reduce) operation of the pump 18 and thereby improve the energy efficiency of the equalization tank assembly 10 (e.g., such as at times when energy costs are high).

In some embodiments, the controller 80 may actuate the valve 60 to flow wastewater 13 through the return line 62 when a liquid level in the equalization tank 30 (e.g., as indicated by the sensor(s) 32) rises above a predetermined level. The predetermined level in the equalization tank may be configured to produce a sufficient flowrate through the return line 62 to actuate the electricity generation assembly 50. In some embodiments, the controller 80 may actuate the valve 61 to selectively flow wastewater 13 through the additional return line 63 either in the alternative or in addition to flowing wastewater 13 through the return line 62.

In some embodiments, the controller 80 may actuate the valve 60 to maintain a relatively stable flow rate through the return line 62 and through the electricity generation assembly 50 and thereby ensure a consistent operation and power output from the generator 52 (e.g., via a stable generator shaft rotational speed). Thus, via actuation of the valve 60, the controller 80 may ensure consistent and stable power generation via the generator 52, even though the liquid level (and therefore head pressure) in the equalization tank 30 is changing over time.

In some embodiments, the controller 80 may monitor operation of the generator 52 to prevent an increase of the rotational speed of a shaft 54 connecting the generator 52 to other components (e.g., water wheel 150 described herein) of the electricity generation assembly 50 above a threshold. Specifically, if electrical load on the generator 52 were lost (e.g., in the case where generator 52 supplies electrical power directly to one or more components of the equalization tank assembly 10, wastewater system, or other system, etc.), the flow of wastewater 13 through the electricity power generation assembly 10 may cause a sudden increase in the rotational speed of the shaft 54. Thus, the controller 80 may monitor the electrical load on the generator 52 (and/or rotational speed on the shaft 54) and may apply additional electrical load to the generator 52 (e.g., by connecting the generator 52 to a battery bank for charging, a resistive heating coil, or other load) so as to balance the torque applied to the shaft 54 and maintain a rotational speed of the shaft 54 within desired limits.

In some embodiments, the controller 80 may actuate one or more components of the equalization tank assembly 10 (e.g., valves 60, 61, adjustable valve member 20, pump 18, etc.) so as to enable or increase diversion of wastewater 13 through the equalization tank 30 and electricity generation assembly 50 to produce electrical power during times of higher flow rates through the pipeline 12. Conversely, the controller 80 may actuate one or more components of the equalization tank assembly 10 so as to prevent or reduce diversion of wastewater 13 to the equalization tank 30 when flow rates through the pipeline 12 may be below a desired amount for feeding downstream pipelines and/or facilities of the wastewater system.

Thus, the controller 80 may be utilized to selectively control flow of wastewater through the equalization tank assembly 10. As a result, the flow of wastewater 13 may be more effectively managed via the equalization tank assembly 10, and may allow for enhanced operating efficiency for both the equalization tank assembly 10 and the wastewater system more broadly. For instance, the flow of wastewater 13 through the equalization tank assembly 10 may be adjusted to: (1) prevent or enable operation of one or more powered components (e.g., pumps, valves, etc.) of the equalization tank assembly 10 or wastewater system; (2) to adjust the timing of operation of the one or more powered components (e.g., to times of lower carbon output or energy costs); and/or (3) to maximize or optimize electrical power production from the flow of wastewater 13 through the electricity generation assembly 50.

In some embodiments, the controller 80 may be configured to control the flow of wastewater 13 into and/or out of the equalization tank assembly 10 based on a power output by one or more electricity generation assemblies (e.g., local grid, electricity generation assembly 50 and/or solar panel(s) 34, wind turbine(s) described in more detail herein). For instance, the controller 80 may adjust a position of the actuatable valving member 20 to ensure a sufficient volume or level of wastewater 13 in the sump 14 to match or correspond with a flow rate through the pump 18 based on the available electrical power generated by the one or more electricity generation assemblies of the equalization tank assembly 10.

In some embodiments, the controller 80 may be configured to increase or decrease the flow of wastewater 13 out of the pipeline 12 and into the equalization tank assembly 10 based on a flow rate or liquid level in the pipeline 12 (or other pipeline or fluid flow infrastructure upstream of pipeline 12 in the wastewater system). For instance, in some embodiments, the controller 80 may increase or decrease the flow of wastewater 13 out of the pipeline 12 and into the equalization tank assembly 10 to maintain (or substantially maintain) a desired flow rate in the pipeline 12. In some embodiments, the controller 80 may actuate the adjustable valving member 20 if a liquid level in the pipeline 12 (e.g., based on an output from a suitable sensor or sensors) or an estimated future liquid level in the pipeline 12 so as to avoid an overflow in the pipeline 12, downstream pipeline(s), and/or downstream water treatment and/or storage facilities, etc.

Regardless of a potential overflow of wastewater 13, diverting flow out of the pipeline 12 and into the equalization tank assembly 10 may reduce operation (e.g., via duty cycle, operating speed, etc.) of one or more pumps or other downstream powered flow components in the wastewater system and thereby may increase an operating efficiency of the wastewater system overall. Thus, in some embodiments, the controller 80 (or another controller communicatively coupled to controller 80) may determine an estimated flow (e.g., flow rate such as mass flow rate or volumetric flow rate) out of the pipeline 12 that will produce a desired reduction in electrical power consumption for one or more powered flow components of the wastewater system (e.g., via a dynamic baseline data analytics algorithm or other suitable method). In some embodiments, the desired reduction in electrical power consumption may correspond with peak demand times for the local electrical grid.

As previously described, an adjustable valving member 20 may be positioned between the pipeline 12 and the sump 14 that is configured to adjust a flow of wastewater 13 into the sump 14 during operations. The adjustable valving member 20 may utilized a variety of designs. For instance, as previously described, the adjustable valving member 20 may comprise an actuatable weir that may be positioned along a sidewall of the pipeline 12. Some examples of an actuatable weir are described herein and shown in FIGS. 2 and 3 according to some embodiments.

Figure 2:
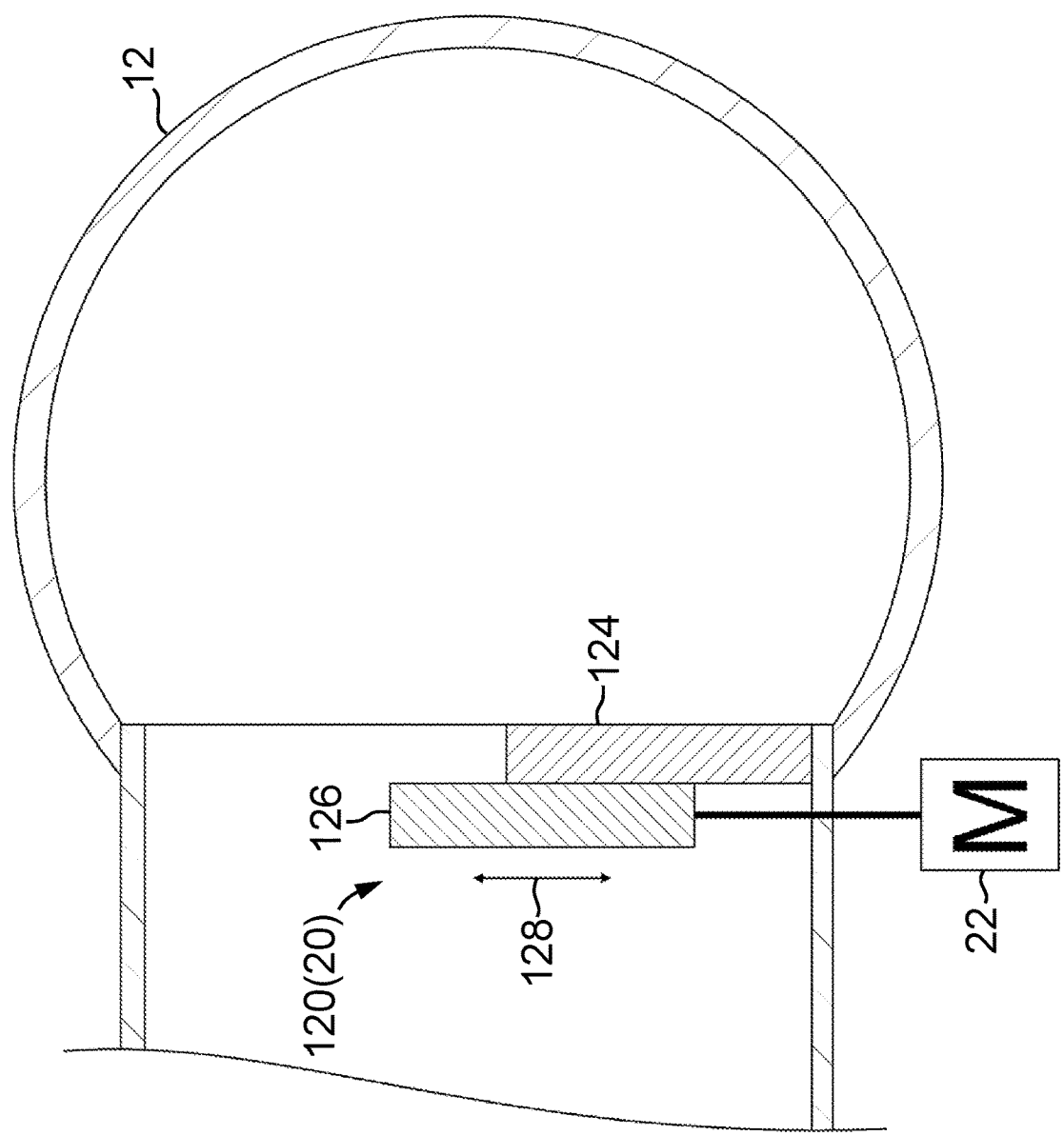
FIG. 2 is a side view of an embodiment of an actuatable weir of the equalization tank system of FIG. 1 according to some embodiments disclosed herein.

Referring now to FIG. 2, in some embodiments, the adjustable valving member 20 may comprise an actuatable weir 120 that includes one or more actuatable gates 126 that are coupled to the motor 22. Specifically, in the embodiments illustrated in FIG. 2, the actuatable gate 126 is moveable in a vertical direction (e.g., along arrow 128 in FIG. 2) relative to and along a base or fixed weir plate 124 to adjust an overall vertical height (e.g., along arrow 128) of the actuatable weir 120 during operations. As the height of the actuatable weir 120 decreases along the arrow 128 (e.g., via vertical adjustment of the actuatable gate 126) a flow rate of wastewater 13 out of the pipeline 12 and over the adjustable weir 120 may increase or a lower liquid level in the pipeline 12 may be allowed to spill over the actuatable weir 120 and flow into the sump 14 (FIG. 1).

In some embodiments, the actuatable weir 120 may have a maximum overall height that will still allow wastewater 13 in the pipeline 12 to spill over the adjustable weir 120 when a liquid level in the pipeline 12 reaches a sufficient height. Specifically, the actuatable weir 120 may achieve its maximum height by adjusting the actuatable gate 126 to its highest vertical position relative to the fixed weir plate 124. Without being limited to this or any other theory, limiting the maximum height of the actuatable weir 120 may ensure the equalization tank 30 is configured to receive wastewater 13 from the pipeline 12 during times of extremely high flow rates in the wastewater system (e.g., such as flow rates that would overwhelm a downstream water treatment or storage facility).

Figure 3:
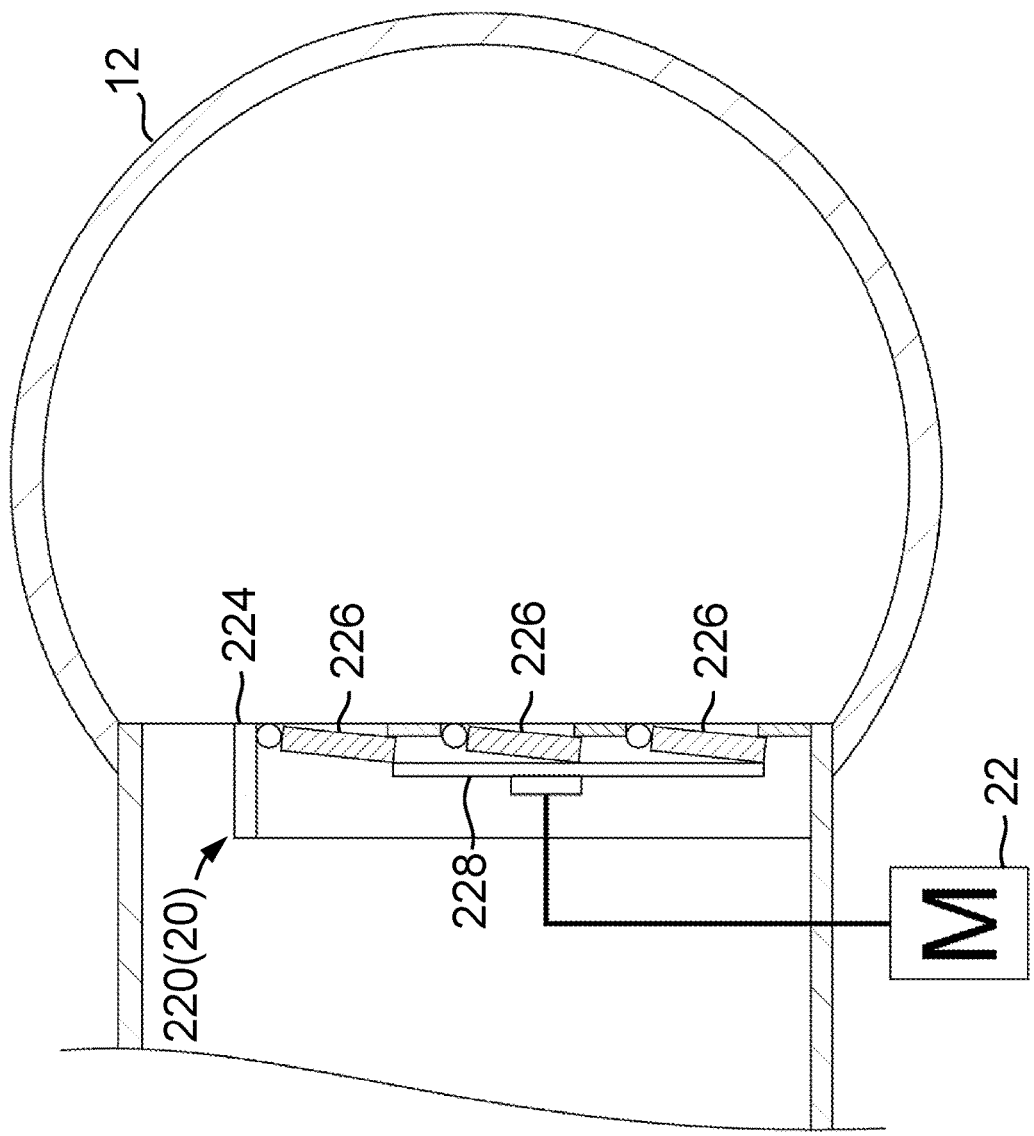
FIG. 3 is a side view of another embodiment of an actuatable weir of the equalization tank system of FIG. 1 in a closed position according to some embodiments disclosed herein.
Figure 4:
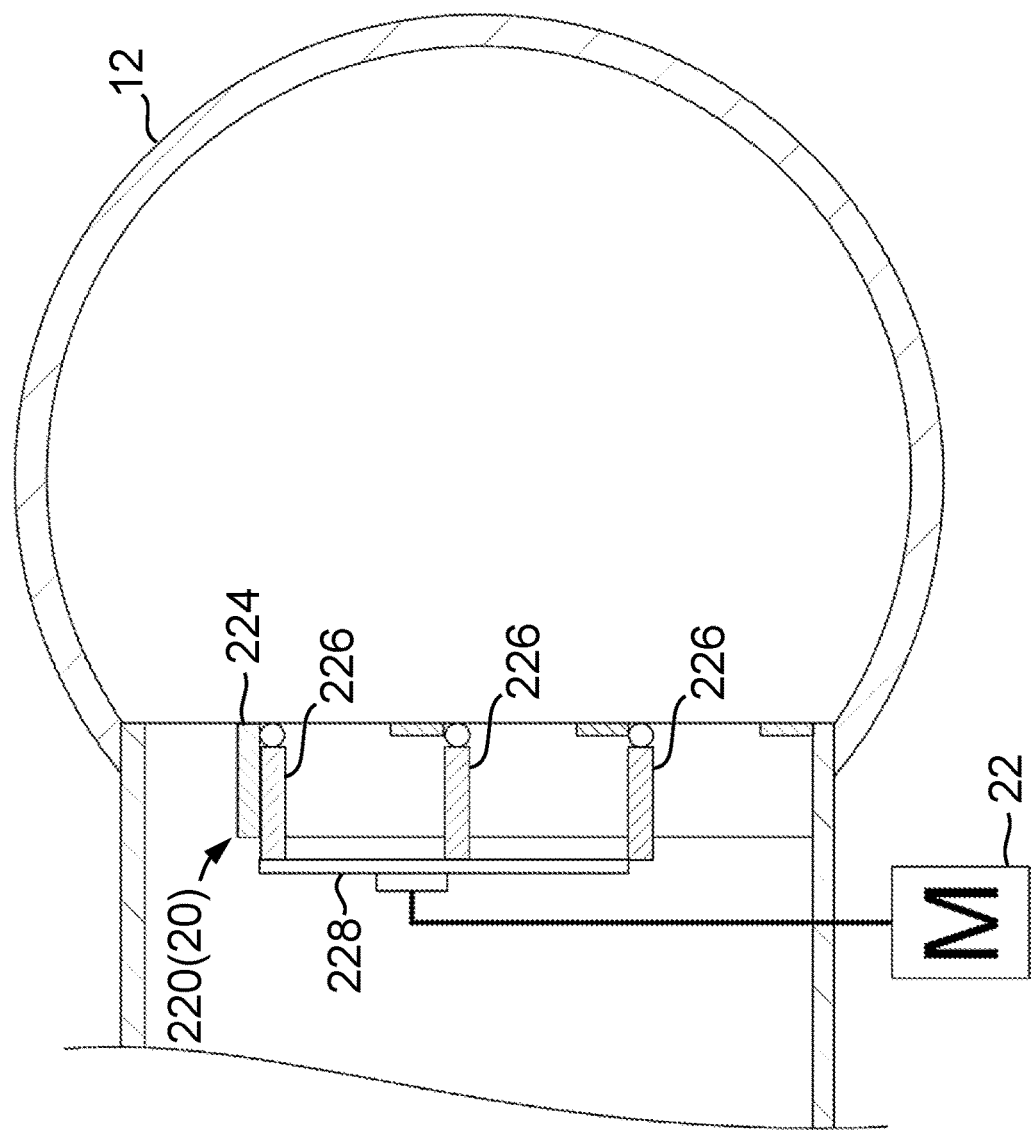
FIG. 4 is a side view of the actuatable weir of FIG. 3 in the open position according to some embodiments disclosed herein.

Referring now to FIGS. 3 and 4, in some embodiments, the adjustable valving member 20 may comprise an actuatable weir 220 that includes a plurality of louvers 226 that may be rotated to prevent, allow, increase, or decrease the flow of wastewater 13 (FIG. 1) out of the pipeline 12 and through the actuatable weir 220. The louvers 226 may be pivotably coupled to a frame 224 that defines the general structure of the louvered weir 220. The louvers 226 (or one or more of the louvers 226) may be interconnected via a linkage 228, which is in turn coupled to the motor 22.

As shown in FIGS. 3 and 4, during operations, the motor 22 may actuate the linkage 228 so as to selectively open or close the louvers 226 during operations. In some embodiments, the motor 22 may include a plurality of motors 22 that are connected to different louvers 226 or groups of louvers 226 (e.g., via suitable linkages) so as to selectively increase or decrease a liquid level or height of wastewater 13 in the pipeline 12 that may flow over or through the actuatable weir 220 and into the sump 14 (FIG. 1). In some embodiments, the frame 224 may define a maximum blocking height of the actuatable weir 220 when all of the louvers 226 are closed (FIG. 3). As with the actuatable weir 120, the maximum overall height of the actuatable weir 220 may be selected to allow a sufficiently high liquid level of wastewater 13 in the pipeline 12 to flow over the louvered weir 220 and into the sump 14 so as to prevent overflowing downstream piping sections of the wastewater system and/or water treatment and/or storage facilities as previously described. In some embodiments, one or more screens may be placed upstream of the louvered weir 220 to prevent at least some solids in the wastewater 13 from flowing to or through the louvered weir 220 (which may cause clogging via entanglement in the louvers 226).

Figure 6:
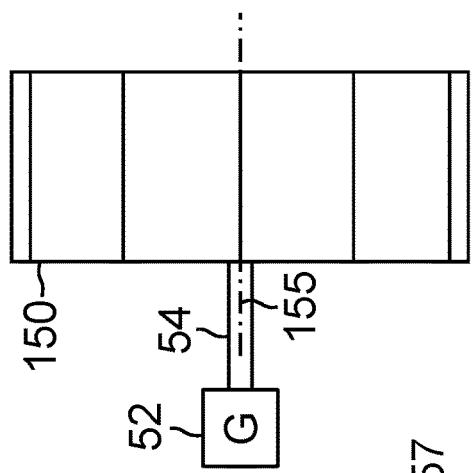
FIG. 6 is a schematic view of a water wheel of the electricity generation assembly of FIG. 5 connected to an electrical generator according to some embodiments disclosed herein.
Figure 5:
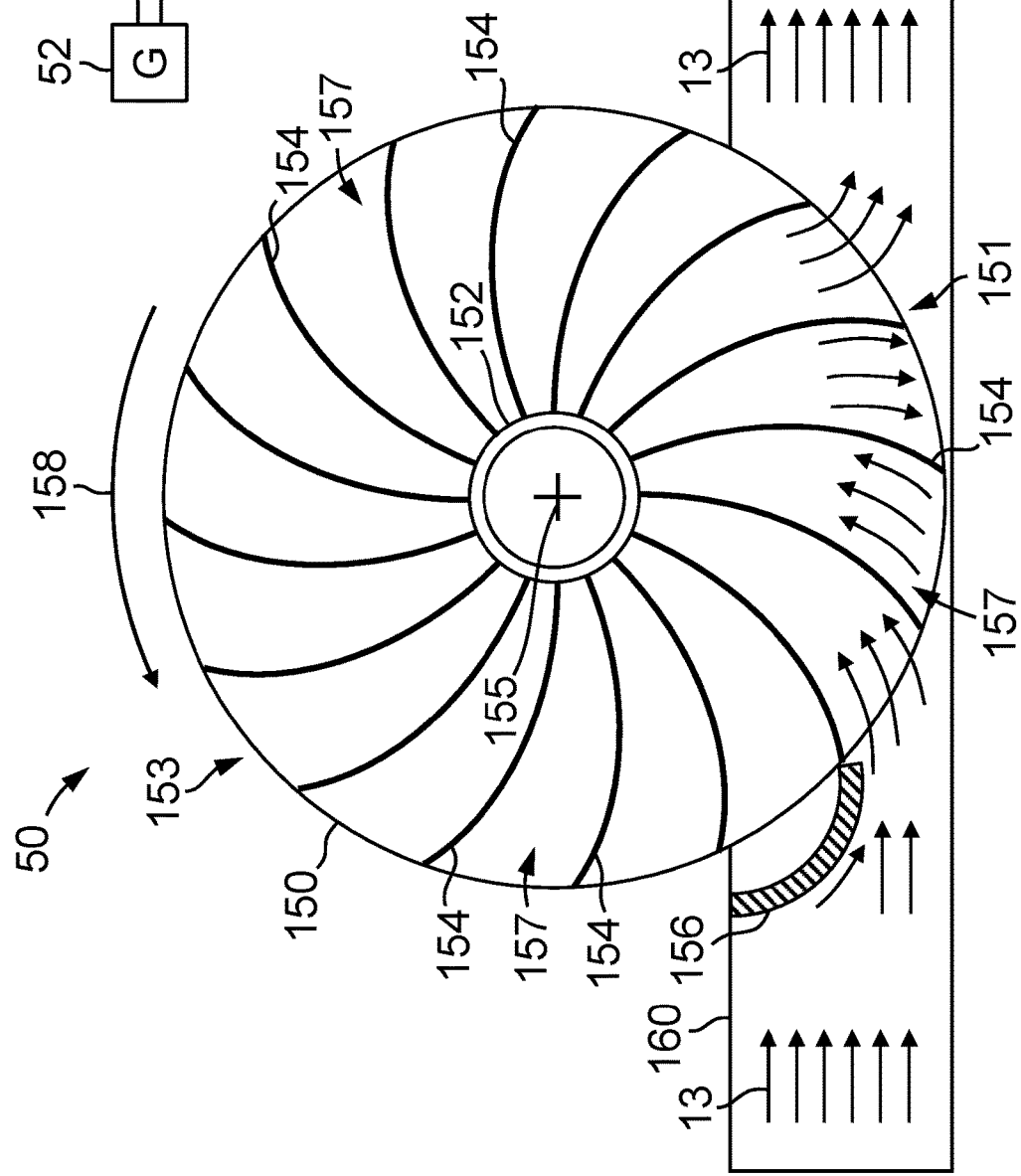
FIG. 5 is a side view of an electricity generation assembly of the equalization tank system of FIG. 1 according to some embodiments disclosed herein.

Referring now to FIGS. 5 and 6, as previously described, in some embodiments, the electricity generation assembly 50 may include a water wheel 150 (or more simply "wheel" 150) that may convert the flow of wastewater 13 into electrical power. Specifically, the flow of wastewater 13 may rotate the wheel 150 about an axis of rotation 155 (or more simply "axis 155"). As shown in FIG. 6, the wheel 150 may be coupled to the electrical generator 52 via the shaft 54 so that when the wheel 150 rotates about the axis 155, the shaft 54 also rotates to actuate the electrical generator 52 and thereby generate electrical power.

The electricity generation assembly 50 may include a flow channel 160 that directs the wastewater 13 through the wheel 150 during operations. The flow channel 160 (or more simply "channel 160") may be a semi-open flow channel that may make up at least a portion of the return line 62 shown in FIG. 1 (or that may be in fluid communication with but separate from—such as parallel to—the return line 62). A flow deflector 156 may be positioned in the channel 160 that is configured to at least partially constrict the cross-sectional flow area within the channel 160 so as to increase a flow velocity of the wastewater 13. In addition, the flow deflector 156 may deflect the flow of wastewater 13 into the wheel 150 so as to ensure a more efficient force transfer between the wastewater 13 and wheel 150 during operations.

The water wheel 150 may be oriented such that the axis 155 may be generally perpendicular to the flow direction of the wastewater 13 through the channel 160. In particular, the axis 155 may be generally oriented in a horizontal direction such that the water wheel 150 may rotate about axis 155 in a vertically oriented plane that is oriented in a radial or perpendicular direction to the axis 155. As used herein, a vertical direction may be substantially aligned along the force of gravity.

In addition, the water wheel 150 may be positioned such that a first portion 151 of the water wheel 150 is inserted and projected into the channel 160 to engage and interact with the flow of wastewater 13, and a second, remaining portion 153 of the water wheel 150 is projected outside of the channel 160 and is not in contact with the flow of wastewater 13. The first portion 151 may comprise a minor portion of the water wheel 150, such as less than 50% of the outer circumference of the water wheel 150 about the axis 155, and the second portion 153 may comprise a major portion of the water wheel 150, such as greater than 50% of the outer circumference of the water wheel 150 about the axis 155. For example, in some embodiments, the first portion 151 may cover and extend along less than or equal to 30° (e.g., ≤20°, ≤10°, ≤5°, etc.) of the outer circumference of the water wheel 150 about the axis 155, and the second portion 153 may cover and extend along 30° or greater (e.g., ≥30°, ≥40°, ≥50°, ≥180°, ≥270°, etc.). Thus, a majority of the water wheel 150 is positioned outside of the channel 160 and not in contact with the flow of wastewater 13 at any point in time during operations.

Without being limited to this or any other theory, placing a portion (such as a major portion 153) of the wheel 150 outside of the channel 160 may expose a majority of an outer circumference of the wheel 150 out of the channel 160 for inspection and maintenance. Thus, wheel 150 may be more easily inspected or cleaned (e.g., of solids flowing in the wastewater 13) to ensure reliable operations over time.

The water wheel 150 may comprise a so-called Poncelet wheel that includes a plurality of curved blades 154 extending outward from a hub 152 (or outward toward an outer circumference of the wheel 150). The blades 154 may be generally curved away from the direction of rotation 158 about the axis 155 of the wheel 150 so that the blades 154 are generally concave relative to the direction of flow of the wastewater 13 in the channel 160. The blades 154 are circumferentially spaced from one another about the axis 155 so that a plurality of curved channels 157 are formed circumferentially between circumferentially adjacent pairs of the blades 154 about axis 155.

Still other water wheel designs are contemplated in other embodiments. For instance, in some embodiments, the water wheel 150 may comprise a so-called breastshot water wheel (e.g., such as a Sagebien wheel or other breastshot water wheel.

During operations, the wastewater 13 may flow along the channel 160 and may then be constricted by the flow deflector 156 so as to flow into a corresponding one of the curved channels 157 of the wheel 150. Specifically, the flow deflector 156 may have a curved shape that generally follows or corresponds with the curvature of the blades 154 and channels 157 so that when the wastewater 13 flows along the flow deflector 156 it is generally directed into a corresponding one of the channels 157. The wastewater 13 may initially flow upward along a corresponding one of the curved blades 154, which may impart a moment on the wheel 150 about the axis of rotation 155 that may drive rotation of the wheel 150 about the axis 155.

Once the channel 157 that received the wastewater 13 is rotated away from the flow deflector 156, the wastewater 13 is free to fall out of the channel 157 to continue to progress along the channel 160 and return line 62 to the pipeline 12 (FIG. 1). The open channels 157 of the wheel 150 may be particularly useful for handling wastewater 13 that may have solids (e.g., woven fabrics, non-woven fabrics, biomass, refuse, etc.) entrained therein. The solids, particularly fabrics, such as wipes or toilet paper, tend to collect on blades, impellers, and other flow control devices. However, the open channels 157 and the generally radially inward-outward flow of wastewater from the channels 157 (e.g., relative to axis 155) on the wheel 150 may tend to avoid entangling fabrics or other solids that are flowing with the wastewater 13. Specifically, the flow of wastewater 13 may be bi-directional relative to the channels 157—first flowing into the channels 157 in a generally radially inward direction toward the axis 155, and then out of the channels 157 in a generally radially outward direction away from axis 155 as the wheel 150 rotates. The outward flow of the wastewater 13 from the channels 157 and along the corresponding blades 154 (e.g., when the wastewater 13 exits the wheel 150) may sweep or clean and collected solids from the blades 154, so that the solids may continue out of the electricity generation assembly 50 along with the wastewater 13. As a result, the wheel 150 may be configured to avoid or minimize clogs and blockages that are common with wastewater 13 applications.

In some embodiments, the electricity generation assembly 50 may include a plurality of water wheels 150 connected to the shaft 54 that are to actuate the generator 52 during operations. Each of the plurality of water wheels 150 may be fed wastewater 13 via a separate line that is in communication with the equalization tank 30 (FIG. 1) and may include flow control device(s) (e.g., one or more control valves similar to valves 60, 61, previously described). During operations, the controller 80 may selectively adjust the flow to and through each of the plurality of wheels 150 to maintain a constant (or substantially constant) torque on the shaft 54 as the liquid level (and head pressure) in the equalization tank 30 decreases. For instance, as the liquid level in the equalization tank 30 decreases, the controller 80 may actuate one or more valves (or other flow control devices) to flow wastewater 13 to additional ones of the plurality of water wheels 150 to maintain a desired torque on the shaft 54 and generator 52.

Referring again to FIG. 1, in some embodiments, additional electrical power generation assemblies (e.g., additional to electrical power generation assembly 150) may be included in the equalization tank assembly 10. For instance, one or more solar panels (e.g., photovoltaic cells) 34 may be employed to generate electrical power that may be utilized to operate one or more of the components of equalization tank assembly 10 (e.g., controller 80, pump 18, motor 22, valves 60, 61, etc.). The solar panel(s) 34 may be installed in a vertically elevated position—such as on top of the equalization tank 30 as shown in FIG. 1—in order to maximize exposure to sunlight during daylight hours. In some embodiments, other renewable energy sources (e.g., such as wind power) may be utilized by the equalization tank assembly 10 either in addition to or in the alternative of solar panels 34.

Figure 7:
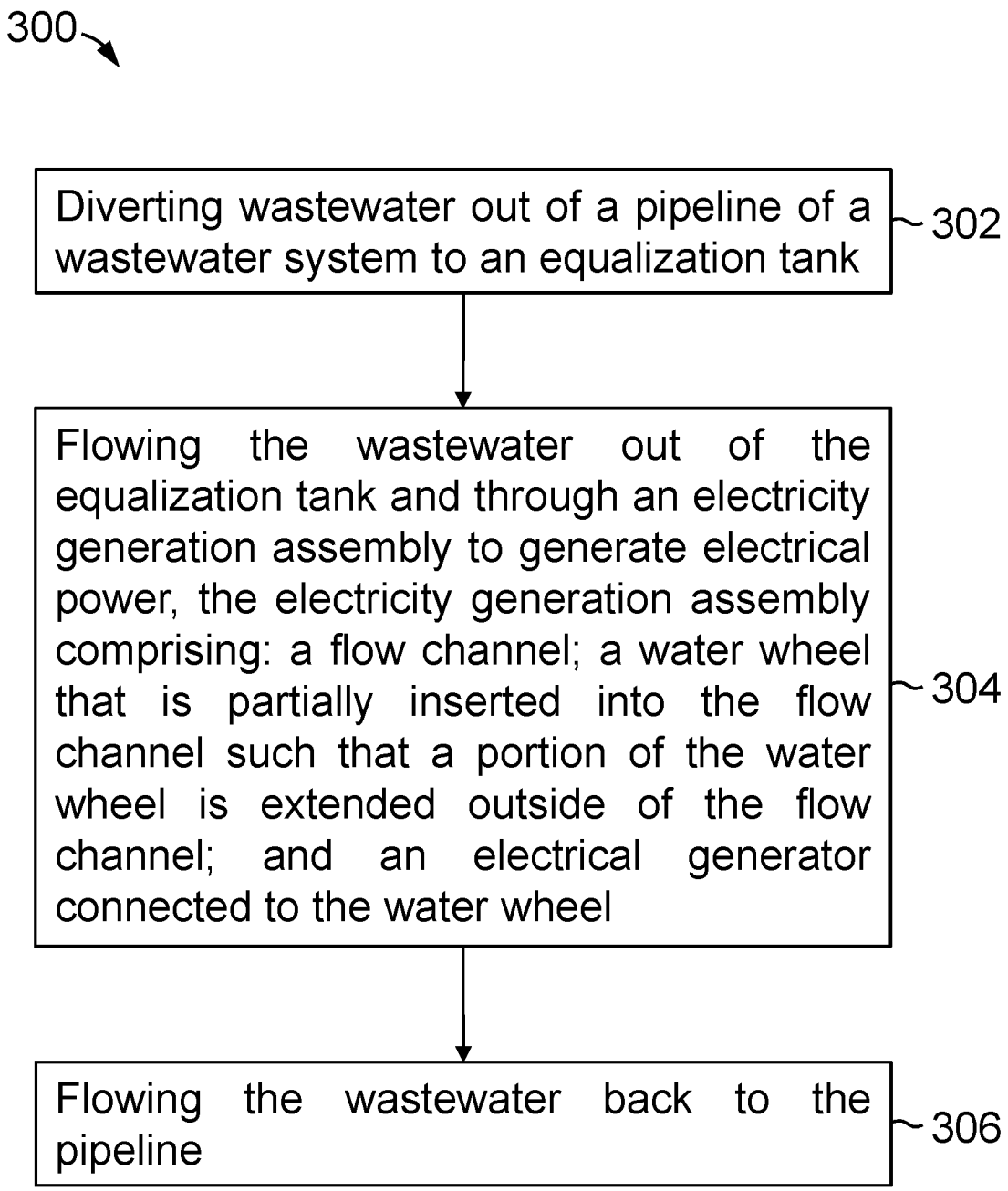
FIG. 7 is a flow diagram of a method of flowing wastewater from a wastewater system through an equalization tank assembly according to some embodiments disclosed herein.

Referring now to FIG. 7, a method 300 of flowing wastewater from a wastewater system through an equalization tank assembly is shown according to some embodiments. In some embodiments, the method 300 may be performed using embodiments of the equalization tank assembly 10 previously described herein and shown in FIGS. 1-6. Thus, in describing the features of method 300, continuing reference is made to the features depicted in FIGS. 1-6 and/or described herein. However, it should be appreciated that method 300 may be performed using systems and assemblies that are different in at least some respects from equalization tank assembly 10.

Initially, method 300 includes diverting wastewater out of a pipeline of a wastewater system to an equalization tank at block 302. For instance, as described herein for the equalization tank assembly 10, the wastewater 13 is diverted out of the pipeline 12 and toward the equalization tank 30 via the adjustable valving member 20 and the sump 14. Thus, diverting the wastewater at block 302 may include actuating an actuatable weir (e.g., weirs 120, 220, etc.) to adjust a liquid height in the pipeline 12 that is configured to flow past the weir 120, 220 and into the sump 14.

In addition, method 300 includes flowing the wastewater out of the equalization tank through an electricity generation assembly to generate electrical power at block 304. The electricity generation assembly includes a flow channel, a water wheel that is partially inserted into the flow channel such that a portion of the water wheel is extended outside of the flow channel, and an electrical generator connected to the water wheel.

As described herein for the equalization tank assembly 10, the wastewater 13 that is stored in the equalization tank 30 may be flowed through the electricity generation assembly 50 via the return line 62. Thus, flowing the wastewater through the electricity generation assembly at block 304 may include flowing the wastewater through a flow channel (e.g., flow channel 160) and a Poncelet wheel (e.g., water wheel 150) so that the Poncelet wheel is configured to rotate and actuate an electrical power generator (e.g., power generator 52). As described herein, the water wheel may include a plurality of curved blades (e.g., blades 154) that are concave relative to the direction of flow of wastewater through the flow channel so that the water wheel is configured to prevent or at least reduce clogs in the flow channel 160 caused by solids (e.g., woven fabrics, non-woven fabrics, biomass, refuse, etc.) as described herein.

Further, the method 300 includes flowing the wastewater back to the pipeline at block 306. For instance, as described herein for the equalization tank assembly 10, after the wastewater 13 is flowed through the electricity generation assembly 50, it is flowed back into the pipeline 12. Thus, flowing the wastewater back to the pipeline at block 306 may occur after flowing the wastewater through the electricity generation assembly at block 304. The wastewater may be flowed back to the pipeline at a point that is downstream from where the wastewater was diverted out of the pipeline at block 302.

As explained above and reiterated below, the present disclosure includes, without limitation, the following example implementations.

Clause 1: A system including: a pipeline of a wastewater system; an equalization tank that is configured to receive wastewater from the pipeline; a return line extending from the equalization tank to the pipeline; and an electricity generation assembly in fluid communication with the return line that is configured to generate electrical power using a flow of wastewater through the return line, wherein the electricity generation assembly includes: a flow channel; a water wheel that is partially inserted into the flow channel such that a portion of the water wheel is extended outside of the flow channel; and an electrical generator connected to the water wheel.

Clause 2: The system of any of the clauses, wherein the water wheel includes an axis of rotation and a plurality of curved blades that are circumferentially spaced about the axis of rotation.

Clause 3: The system of any of the clauses, wherein the plurality of curved blades are concave to a direction of flow for the wastewater in the flow channel.

Clause 4: The system of any of the clauses, wherein the portion of the water wheel that is extended outside of the flow channel is a majority of an outer circumference of the water wheel about the axis of rotation.

Clause 5: The system of any of the clauses, further comprising a weir that is in fluid communication with the pipeline that is actuatable to adjust a flow of wastewater to the equalization tank.

Clause 6: The system of any of the clauses, wherein the weir includes a gate that is vertically adjustable to adjust an overall height of the weir.

Clause 7: The system of any of the clauses, wherein the weir includes one or more louvers that are configured to adjust a flow of wastewater through the weir.

Clause 8: The system of any of the clauses, further comprising: a valve positioned along the return line; and a controller configured to actuate the valve and the weir to control a flow wastewater through the equalization tank and the electricity generation assembly.

Clause 9: A method comprising: (a) diverting wastewater out of a pipeline of a wastewater system to an equalization tank; (b) flowing the wastewater out of the equalization tank and through an electricity generation assembly to generate electrical power, the electricity generation assembly comprising: a flow channel; a water wheel that is partially inserted into the flow channel such that a portion of the water wheel is extended outside of the flow channel; and an electrical generator connected to the water wheel; and (c) flowing the wastewater back to the pipeline after (b).

Clause 10: The method of any of the clauses, wherein (a) comprises actuating a weir in the pipeline to adjust a liquid height in the pipeline that will result in flow out of the pipeline and into the equalization tank.

Clause 11: The method of any of the clauses, wherein (a) comprises adjusting a vertical height of a gate of the weir.

Clause 12: The method of any of the clauses, wherein (a) comprises rotating a louver of the weir.

Clause 13: The method of any of the clauses, wherein (b) comprises receiving wastewater into a plurality of curved channels defined by a plurality of curved blades that are circumferentially spaced about an axis of rotation of the water wheel.

Clause 14: The method of any of the clauses, wherein the plurality of curved blades are concave to a direction of flow of the wastewater in the flow channel.

Clause 15: The method of any of the clauses, wherein (b) comprises receiving wastewater into the plurality of curved channels extend along less than 50% of an outer circumference of the water wheel about the axis of rotation.

Clause 16: The method of any of the clauses, wherein (c) comprises adjusting a valve in fluid communication between the equalization tank and the electricity generation assembly.

Clause 17: A system including: a pipeline of a wastewater system; an equalization tank; a weir in the pipeline that is actuatable to adjust a liquid height in the pipeline that is configured to flow past the weir and toward the equalization tank; a return line extending from the equalization tank to the pipeline; and an electricity generation assembly in fluid communication with the return line that is configured to generate electrical power using a flow of wastewater, wherein the electricity generation assembly includes: a flow channel; a Poncelet wheel that is inserted into the flow channel; and an electrical generator connected to the Poncelet wheel.

Clause 18: The system of any of the clauses, wherein the weir includes a gate that is vertically movable to adjust the liquid height in the pipeline that is configured to flow past the weir.

Clause 19: The system of any of the clauses, wherein the weir includes a louver that is movable to adjust the liquid height in the pipeline that is configured to flow past the weir.

Clause 20: The system of any of the clauses, wherein the Poncelet wheel is configured to engage with the wastewater in the flow channel along less than 50% of an outer circumference of the Poncelet wheel.

The embodiments disclosed herein include systems and methods for enhancing the performance, utility, and controllability of an equalization tank assembly in a wastewater system. In some embodiments, an adjustable valving member (e.g., such as an actuatable weir) may be included to selectively increase or decrease the flow of fluid from the wastewater system to the equalization tank. In addition, in some embodiments, an electricity generation assembly may be included that is configured to generate electrical power from the fluid outflow from the equalization tank. Through use of the embodiments disclosed herein, an equalization tank for a wastewater system may achieve more efficient and reliable operation.

While embodiments described herein include a water wheel (e.g., water wheel 150) for converting the flow of wastewater 13 into electrical power, some embodiments may employ alternative devices or systems. For instance, in some embodiments, a turbine, such as a so-called Kaplan turbine, may engage with the flow of wastewater 13 in the return line 62 to thereby actuate the electrical generator 52 to generate electrical power as previously described. Additional systems are also contemplated (e.g., reciprocating systems, paddle wheels, magneto-Hydro dynamic generators, etc.).

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system including:
    a pipeline of a wastewater system;
    an equalization tank that is configured to receive wastewater from the pipeline;
    a return line extending from the equalization tank to the pipeline;
    an adjustable valving member positioned on a sidewall of the pipeline and is in fluid communication with the pipeline, the adjustable valving member being actuatable to adjust a flow of wastewater to the equalization tank; and an electricity generation assembly in fluid communication with the return line that is configured to generate electrical power using a flow of wastewater through the return line, wherein the electricity generation assembly includes:
a flow channel;
a water wheel that is partially inserted into the flow channel such that a portion of the water wheel is extended outside of the flow channel; and
an electrical generator connected to the water wheel, and
wherein the adjustable valving member includes an actuatable weir, the actuatable weir includes one or more actuatable gates moveable in a vertical direction relative to and along a base or fixed weir plate to adjust an overall vertical height of the weir.

2. The system of claim 1, wherein the water wheel includes an axis of rotation and a plurality of curved blades that are circumferentially spaced about the axis of rotation.

3. The system of claim 2, wherein the plurality of curved blades are concave to a direction of flow for the wastewater in the flow channel.

4. The system of claim 3, wherein the portion of the water wheel that is extended outside of the flow channel is a majority of an outer circumference of the water wheel about the axis of rotation.

5. The system of claim 1, wherein the actuatable weir reaches a maximum overall vertical height by adjusting the one or more actuatable gate to its highest vertical position relative to the base or fixed weir plate.

6. The system of claim 5, wherein the maximum overall vertical height is sized to allow wastewater to spill over the actuatable weir when a liquid level in the pipeline reaches a sufficient height.

7. The system of claim 5, wherein the actuatable weir includes one or more louvers that are configured to adjust a flow of wastewater through the actuatable weir.

8. The system of claim 5, further comprising:
a valve positioned along the return line; and
a controller configured to actuate the valve and the actuatable weir to control a flow wastewater through the equalization tank and the electricity generation assembly.

9. A method comprising:
(a) diverting wastewater out of a pipeline of a wastewater system to an equalization tank;
(b) actuating a weir in the pipeline to adjust a liquid height in the pipeline that will result in flow out of the pipeline and into the equalization tank;
(c) flowing the wastewater out of the equalization tank and through an electricity generation assembly to generate electrical power, the electricity generation assembly comprising:
a flow channel;
a water wheel that is partially inserted into the flow channel such that a portion of the water wheel is extended outside of the flow channel; and
an electrical generator connected to the water wheel; and
(d) flowing the wastewater back to the pipeline after (c), and
adjusting a flowrate of the wastewater out of the equalization tank using an adjustable valving member, wherein the adjustable valving member is positioned on a sidewall of the pipeline and includes an actuatable weir that includes one or more actuatable gate and the one or more actuatable gate is moveable in a vertical direction relative to and along a base or fixed weir plate to adjust an overall vertical height of the weir.

10. The method of claim 9, wherein the actuatable weir reaches a maximum overall vertical height by adjusting the one or more actuatable gate to its highest vertical position relative to the base or fixed weir plate.

11. The method of claim 10, wherein the maximum overall vertical height is sized to allow wastewater to spill over the actuatable weir when a liquid level in the pipeline reaches a sufficient height.

12. The method of claim 10, wherein (b) comprises rotating a louver of the actuatable weir.

13. The method of claim 9, wherein (c) comprises receiving wastewater into a plurality of curved channels defined by a plurality of curved blades that are circumferentially spaced about an axis of rotation of the water wheel.

14. The method of claim 13, wherein the plurality of curved blades are concave to a direction of flow of the wastewater in the flow channel.

15. The method of claim 13, wherein (c) comprises receiving wastewater into the plurality of curved channels extend along less than 50% of an outer circumference of the water wheel about the axis of rotation.

16. The method of claim 9, wherein (d) comprises adjusting a valve in fluid communication between the equalization tank and the electricity generation assembly.

17. A system including:
a pipeline of a wastewater system;
an equalization tank configured to receive wastewater from the pipeline;
an actuatable weir positioned at a sidewall of the pipeline that is actuatable to adjust a liquid height in the pipeline that is configured to flow past the weir and toward the equalization tank;
a return line extending from the equalization tank to the pipeline; and
an electricity generation assembly in fluid communication with the return line that is configured to generate electrical power using a flow of wastewater, wherein the electricity generation assembly includes:
a flow channel;
a Poncelet wheel that is inserted into the flow channel; and an electrical generator connected to the Poncelet wheel,
wherein the actuatable weir includes one or more actuatable gate that is moveable in a vertical direction relative to and along base or fixed weir plate to adjust an overall vertical height of the weir.

18. The system of claim 17, wherein the actuatable weir reaches a maximum overall vertical height by adjusting the one or more actuatable gate to its highest vertical position relative to the base or fixed weir plate and the maximum overall vertical height is sized to allow wastewater to spill over the actuatable weir when a liquid level in the pipeline reaches a sufficient height.

19. The system of claim 17, wherein the actuatable weir includes a louver that is movable to adjust the liquid height in the pipeline that is configured to flow past the actuatable weir.

20. The system of claim 17, wherein the Poncelet wheel is configured to engage with the wastewater in the flow channel along less than 50% of an outer circumference of the Poncelet wheel.

* * * * *